(12) United States Patent
Hassanshahi et al.

(10) Patent No.: US 10,915,639 B2
(45) Date of Patent: Feb. 9, 2021

(54) STAGED DYNAMIC TAINT FLOW INFERENCE

(71) Applicant: ORACLE INTERNATIONAL CORPORATION, Redwood Shores, CA (US)

(72) Inventors: Behnaz Hassanshahi, Brisbane (AU); Hyunjun Lee, Brisbane (AU); Alexander Jordan, Brisbane (AU); Francois Gauthier, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 16/058,876

(22) Filed: Aug. 8, 2018

(65) Prior Publication Data

US 2019/0311131 A1 Oct. 10, 2019

Related U.S. Application Data

(60) Provisional application No. 62/653,325, filed on Apr. 5, 2018.

(51) Int. Cl.
| | |
|---|---|
| *G06F 21/00* | (2013.01) |
| *G06F 21/57* | (2013.01) |
| *G06N 5/04* | (2006.01) |
| *G06F 8/41* | (2018.01) |

(52) U.S. Cl.
CPC ............ *G06F 21/577* (2013.01); *G06F 8/433* (2013.01); *G06N 5/046* (2013.01)

(58) Field of Classification Search
CPC .. G06F 21/577; G06F 8/433; G06F 2221/033; G06F 21/566; G06F 21/52; G06F 21/53; G06F 11/3604; G06N 5/046
See application file for complete search history.

(56) References Cited

U.S. PATENT DOCUMENTS

| | | | | |
|---|---|---|---|---|
| 2013/0133075 | A1* | 5/2013 | Abadi | G06F 21/125 726/25 |
| 2015/0271198 | A1* | 9/2015 | Hay | G06F 21/552 726/25 |
| 2016/0217029 | A1* | 7/2016 | Yoon | G06F 9/54 |

OTHER PUBLICATIONS

Mathis, B. et al., "Detecting Information Flow by Mutating Input Data", In Proceedings of the IEEE/ACM International Conference on Automated Software Engineering, ASE '17, Urbana-Champaign, IL, USA, Oct. 2017, pp. 263-273 (11 pages).
Parameshwaran, I. et al., "Auto-patching DOM-based XSS at Scale", In Proceedings of the 2015 10th Joint Meeting on Foundations of Software Engineering, Bergamo, Italy, Aug. 2015, pp. 272-283 (12 pages).

(Continued)

*Primary Examiner* — Yogesh Paliwal
(74) *Attorney, Agent, or Firm* — Ferguson Braswell Fraser Kubasta PC

(57) ABSTRACT

A method may include obtaining, from a runtime system that executes code, a source value at a source point of the code and a sink value at a sink point of the code, identifying a potential taint flow from the source point to the sink point by performing a series of taint inferences that each infer a relationship between the source value and the sink value, and determining whether the potential taint flow is an actual taint flow by performing a series of taint checks that each analyze the execution of the code using the source value and the sink value.

20 Claims, 5 Drawing Sheets

(56) References Cited

OTHER PUBLICATIONS

Sekar, R. "An Efficient Black-box Technique for Defeating Web Application Attacks", In Proceedings of the Network and Distributed System Security Symposium (NDSS) 2009, (17 pages).
Christophe, L. et al., "Linvail: A General-.Purpose Platform for Shadow Execution of Javascript", In Proceedings of the IEEE 23rd International Conference on Software Analysis, Evolution, and Reengineering (SANER), Suita, Japan, Mar. 2016, pp. 260-270 (11 pages).
Sen, K. et al., "Jalangi: A Selective Record-Replay and Dynamic Analysis Framework for Javascript", In Proceedings of the 2013 9th Joint Meeting on Foundations of Software Engineering, ESEC/FSE 2013, St. Petersburg, Russia, Aug. 2013, pp. 488-498 (11 pages).
Lekies, S. et al., "25 Million Flows Later: Large-Scale Detection of DOM-based XSS", In Proceedings of the 2013 4CM SIGSAC Conference on Computer and Communications Security, Berlin, Germany, Nov. 2013, pp. 1193-1204 (12 pages).

\* cited by examiner

STAGED DYNAMIC TAINT FLOW INFERENCE

CROSS-REFERENCE TO RELATED APPLICATIONS

This application claims benefit under 35 U.S.C. § 119(e) to U.S. Provisional Patent Application Ser. No. 62/653,325, filed on Apr. 5, 2018, having the same inventors, and entitled "STAGED DYNAMIC TAINT FLOW INFERENCE." U.S. Provisional Patent Application Ser. No. 62/653,325 is incorporated herein by reference in its entirety.

BACKGROUND

Dynamic taint analysis is a common technique to detect security (e.g., code injection) vulnerabilities in applications written in dynamic languages, such as JavaScript. Traditionally, dynamic taint analysis tracks tainted values in the program by attaching tags (taint labels), which requires heavyweight instrumentation either at the source-code level or the engine (e.g., JavaScript engine) level. Source code-level instrumentation has the benefit of running on multiple engines, which simplifies maintenance. However, it is difficult to track taint flowing through primitive values, built-in functions, and native code because these cannot be easily instrumented. For example, additional boxing and unboxing of values may be required. Also, because source code-level dynamic taint tracking may alter program semantics, the intended behavior of the program might accidentally be altered. Furthermore, dynamic taint analysis is often based on an imprecise model of program behavior, potentially generating unsound results.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining, from a runtime system that executes code, a source value at a source point of the code and a sink value at a sink point of the code, identifying a potential taint flow from the source point to the sink point by performing a series of taint inferences that each infer a relationship between the source value and the sink value, and determining whether the potential taint flow is an actual taint flow by performing a series of taint checks that each analyze the execution of the code using the source value and the sink value.

In general, in one aspect, one or more embodiments relate to a system including a repository configured to store code. The code includes a source value at a source point and a sink value at a sink point. The system further includes a memory coupled to a processor, and a runtime system executing on the processor and using the memory, configured to identify, by executing the code, the source point and the sink point. The system further includes a taint detector, executing on the processor and using the memory, configured to identify a potential taint flow from the source point to the sink point by performing a series of taint inferences that each infer a relationship between the source value and the sink value, and determine whether the potential taint flow is an actual taint flow by performing a series of taint checks that each analyze the execution of the code using the source value and the sink value.

In general, in one aspect, one or more embodiments relate to a non-transitory computer readable medium including instructions that, when executed by a processor, perform: obtaining, from a runtime system that executes code, a source value at a source point of the code and a sink value at a sink point of the code, identifying a potential taint flow from the source point to the sink point by performing a series of taint inferences that each infer a relationship between the source value and the sink value, and determining whether the potential taint flow is an actual taint flow by performing a series of taint checks that each analyze the execution of the code using the source value and the sink value.

Other aspects of the invention will be apparent from the following description and the appended claims.

DETAILED DESCRIPTION

Figure 1:
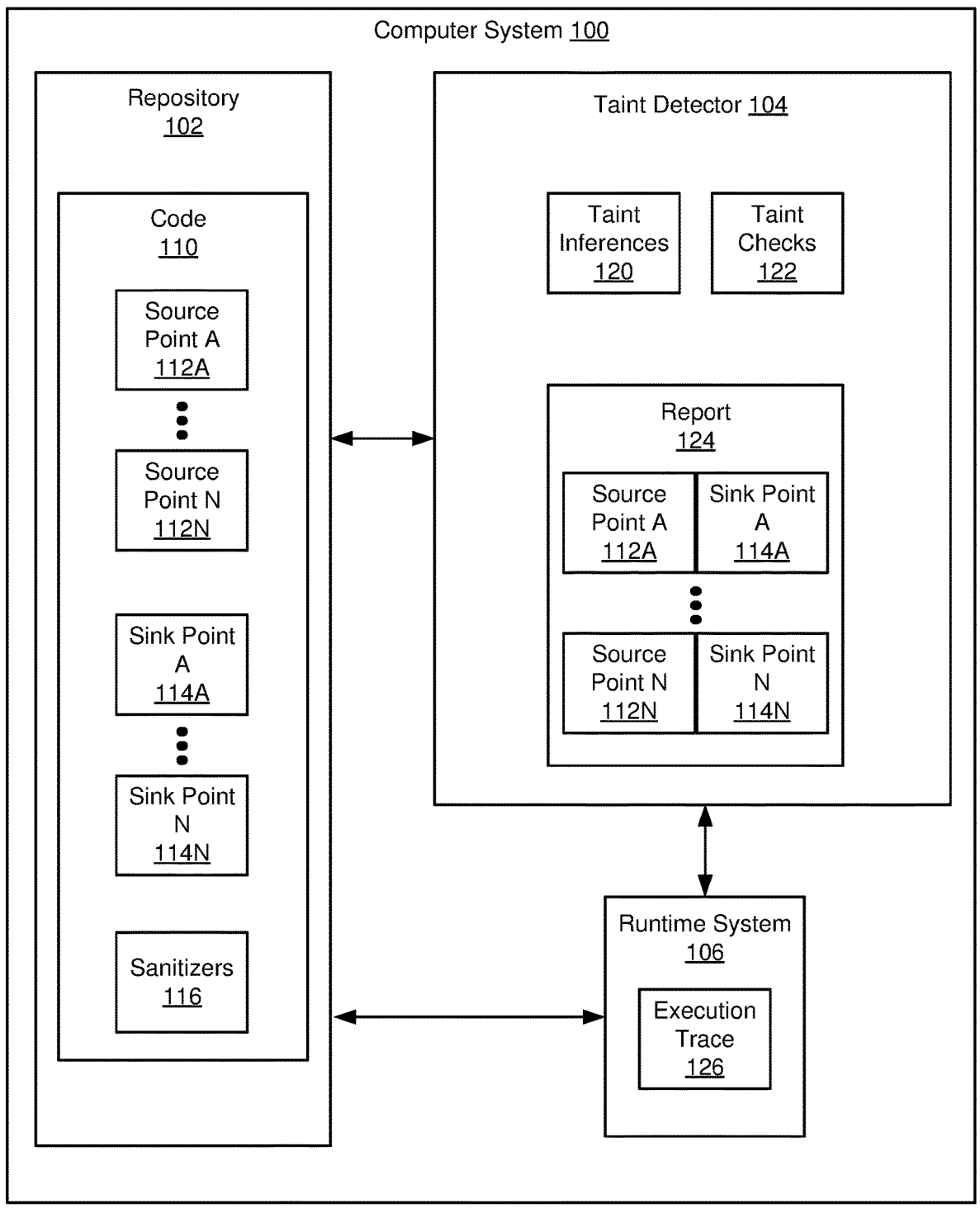
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for dynamic taint flow inference. The inference may be based on correlating sink values at security-sensitive points in the code with source values at points in the code where potential attacker-controlled input may enter. In one or more embodiments, a staged approach is taken, where a series of taint inferences are performed on a source value and a sink value to determine whether a potential taint flow exists. If necessary, the taint inference stage may then be followed by a series of taint checks that analyze the runtime behavior of the code. In one example, a taint inference is performed by determining a substring relationship between the source value and the sink value. In another example, a taint inference is performed by determining a similarity score (e.g., based on an edit distance) between the source value and the sink value. When a potential taint flow cannot be ruled out by the taint inferences, a series of taint checks may be performed to determine whether the potential taint flow corresponds to an actual taint flow (e.g., to rule out false positives). Examples of taint checks include evaluating the runtime impact of mutating the source value on the sink value, and an analysis of an execution trace between the locations of the source value and the sink value in the code.

The level of precision of the taint analysis may be configured by adjusting which taint inferences and which taint checks are performed. Performance is efficient because the taint inferences are lightweight and quickly computable. Furthermore, the result of the taint inference stage may avoid the need for the taint check stage, and thus avoid the computational overhead of a deeper analysis of the runtime behavior of the code, such as precise dynamic taint tracking.

FIG. 1 shows a computer system (100) in accordance with one or more embodiments of the invention. As shown in FIG. 1, the computer system (100) includes a repository (102), a taint detector (104), and a runtime system (106). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110). In one or more embodiments, the code (110) may be any collection of source code including various software components. That is, the code (110) may be any collection of computer instructions written in a human-readable programming language. The code (110) may be transformed by a compiler into binary machine code. Compiled machine code may then be executed by a processor (e.g., contained in the computer system (100)) in order to execute the software components generated from the code (110).

In one or more embodiments, the code (110) includes source points (112a, 112n), sink points (114a, 114n), and sanitizers (116). In one or more embodiments, source points (112a, 112n) and sink points (114a, 114n) are statements in the code (110). For example, a source point (112n) may be a call to an application program interface (API). Alternatively, in one or more embodiments, source points (112a, 112n) and sink points (114a, 114n) are variables, or fields of an object. In one or more embodiments, a source point (112n) is where attacker-controllable input external to the code (110) may be received. Thus, any value received at a source point (112n) may be considered to be potentially tainted (e.g., unsafe).

In one or more embodiments, a sink point (114n) is a statement in the code (106) that uses a variable when performing a security-sensitive operation (e.g., via a function call). For example, the security-sensitive operation may access a security-sensitive resource of the computer system (100) that requires an elevated privilege for access. In one or more embodiments, the sink point (114n) may access the security-sensitive operation via an application program interface (API).

In one or more embodiments, source points (112a, 112n) and sink points (114a, 114n) may be identified by a location in the code (110). For example, the location may be a line number interpreted relative to a function definition that includes the corresponding source point (112n) or sink point (114n).

Continuing with FIG. 1, in one or more embodiments, the taint detector (104) may be implemented in hardware (e.g., circuitry), software, firmware, and/or any combination thereof. In one or more embodiments, the taint detector (104) includes taint inferences (120), taint checks (122), and a report (124). In one or more embodiments, taint inferences (120) are procedures for correlating a source value at a source point (112n) and a sink value at a sink point (114n). The source value may be a program value observed at a source point (112n). Similarly, a sink value may be a program value observed at a sink point (114n). The source values and sink values may be string values. For example, the source values and sink values may be string values resulting from the conversion of non-string values (e.g., integers, objects, arrays, etc.) to string values. One example of a taint inference (120) is determining whether there is an exact substring match between the source value and the sink value (i.e., such that the source value is a substring of the sink value, or vice versa). Another example of a taint inference (120) is determining a similarity score between the source value and the sink value.

In one or more embodiments, taint checks (122) are procedures for observing the behavior of the code (110) relative to a source value at a source point (112n) and a sink value at a sink point (114n). One example of a taint check (122) is observing the impact of mutating the source value on the sink value. Another example of a taint check (122) is identifying a potentially tainted series of operations in an execution trace (126) for the code (110).

In one or more embodiments, the taint detector (104) may include functionality to generate a report (124). The report (124) may include pairs of source points (112a, 112n) and sink points (114a, 114n). The report (124) may be stored as a document capable of being accessed by an interested entity (e.g., a programmer). Each pair may indicate a potential taint flow from the source point (112n) to the sink point (114n) such that a tainted value received at the source point (112n) may be propagated to the sink point (114n). The tainted value may be untrusted or unvalidated data that is possibly malicious.

In one or more embodiments, a sanitizer (116) is a statement or function that transforms a potentially tainted value into a safe (e.g., trusted) value that is not associated with a taint flow. In one or more embodiments, a sanitizer (116) modifies a value by encoding or replacing potentially dangerous characters with harmless equivalents. For example, the potentially dangerous characters may be filtered or escaped. The sanitizer may transform a source value, a sink value, or an intermediate value generated from the source value and later used to generate the sink value. In one or more embodiments, a sanitizer (116) may examine a potentially tainted value and determine that no transformation is required because the potentially tainted value is already safe.

Continuing with FIG. 1, in one or more embodiments, the runtime system (106) may be implemented in hardware (e.g., circuitry), software, firmware, and/or any combination thereof. The runtime system (106) may execute the code (110) and provide various support services during execution. In one or more embodiments, the runtime system (106) includes functionality to generate an execution trace (126) for the code (110). The execution trace (126) may include information about the statements executed by the code (110). For example, the execution trace (126) may include a log of statements and/or functions executed by the code (110), including input values, output values, and intermediate values of the statements and/or functions. The runtime system (106) may include functionality to keep track of a value examined and/or modified by a sanitizer (116) indicating whether or not the value is tainted.

In one or more embodiments, the runtime system (106) includes functionality to identify source points (112a, 112n) and sink points (114a, 114n) of the code (110). In one or more embodiments, the runtime system (106) includes functionality to instrument the code (110) to facilitate the extraction of information pertaining to the execution of the code (110) and writing the trace information. The instrumentation may be implemented in the form of code instructions that monitor specific components of the code (110). For example, the runtime system (106) may instrument the code (110) to identify source values and sink values generated during the execution of the code (110).

While FIG. 1 shows a configuration of components, other configurations may be used without departing from the scope of the invention. For example, various components may be combined to create a single component. As another example, the functionality performed by a single component may be performed by two or more components.

Figure 2:
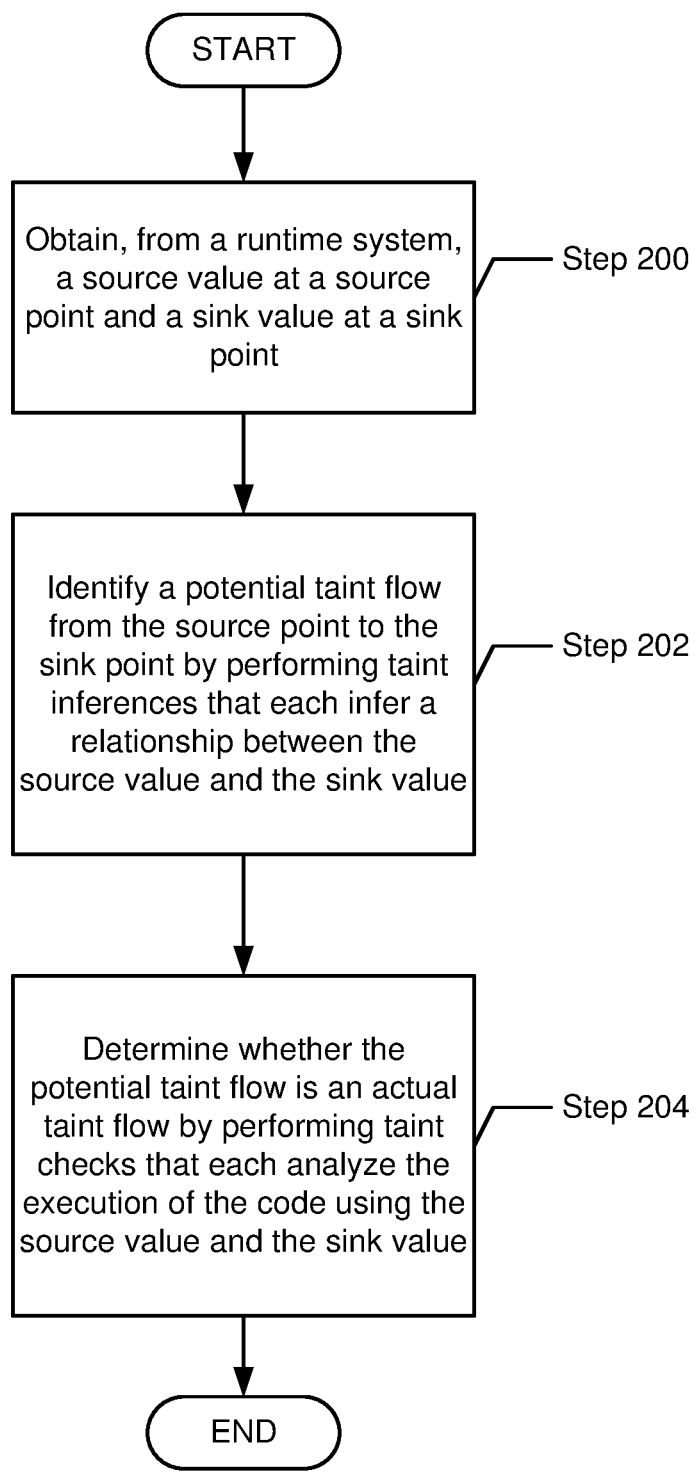
FIG. 2 and FIG. 3 show flowcharts in accordance with one or more embodiments of the invention.

FIG. 2 shows a flowchart in accordance with one or more embodiments of the invention. The flowchart depicts a process for inferring taint flows. One or more of the steps in FIG. 2 may be performed by the components (e.g., the taint detector (104) or the runtime system (106)) of the computer system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a source value at a source point and a sink value at a sink point are obtained. In one or more embodiments, the runtime system identifies the source point and the sink point. For example, sink points may be identified by matching each statement in the code to a list of statements known to access security-sensitive operations. Similarly, source points may be identified by matching each statement in the code to a list of statements known to access external input. The runtime system may obtain the source value and the sink value by executing the code. For example, the runtime system may instrument the code to facilitate the extraction of the source and sink values generated during the execution of the code. In one or more embodiments, Step 200 is executed for each combination of source value and sink value obtained by the runtime system.

In Step 202, a potential taint flow from the source point to the sink point is identified by performing a series of taint inferences. Each taint inference may infer a relationship between the source value of the source point and the sink value of the sink point (e.g., within a predetermined bound). That is, the relationship may be inferred by analyzing the source and sink values, without any additional analysis of the code. See description of Step 304 and Step 308 of FIG. 3 below for examples of taint inferences.

In Step 204, it is determined whether the potential taint flow is an actual taint flow by performing a series of taint checks. Each taint check may analyze the execution of the code using the source value and the sink value. The effect of the taint checks may be viewed as determining whether the potential taint flow identified during the taint inference stage of Step 202 above represents a false positive, or represents an actual taint flow. See description of Step 310 and Step 312 of FIG. 3 below for examples of taint checks.

In one or more embodiments, the level of precision of Step 202 and Step 204 above may be configured via parameters that determine which taint inferences and which taint checks are performed.

Figure 3:
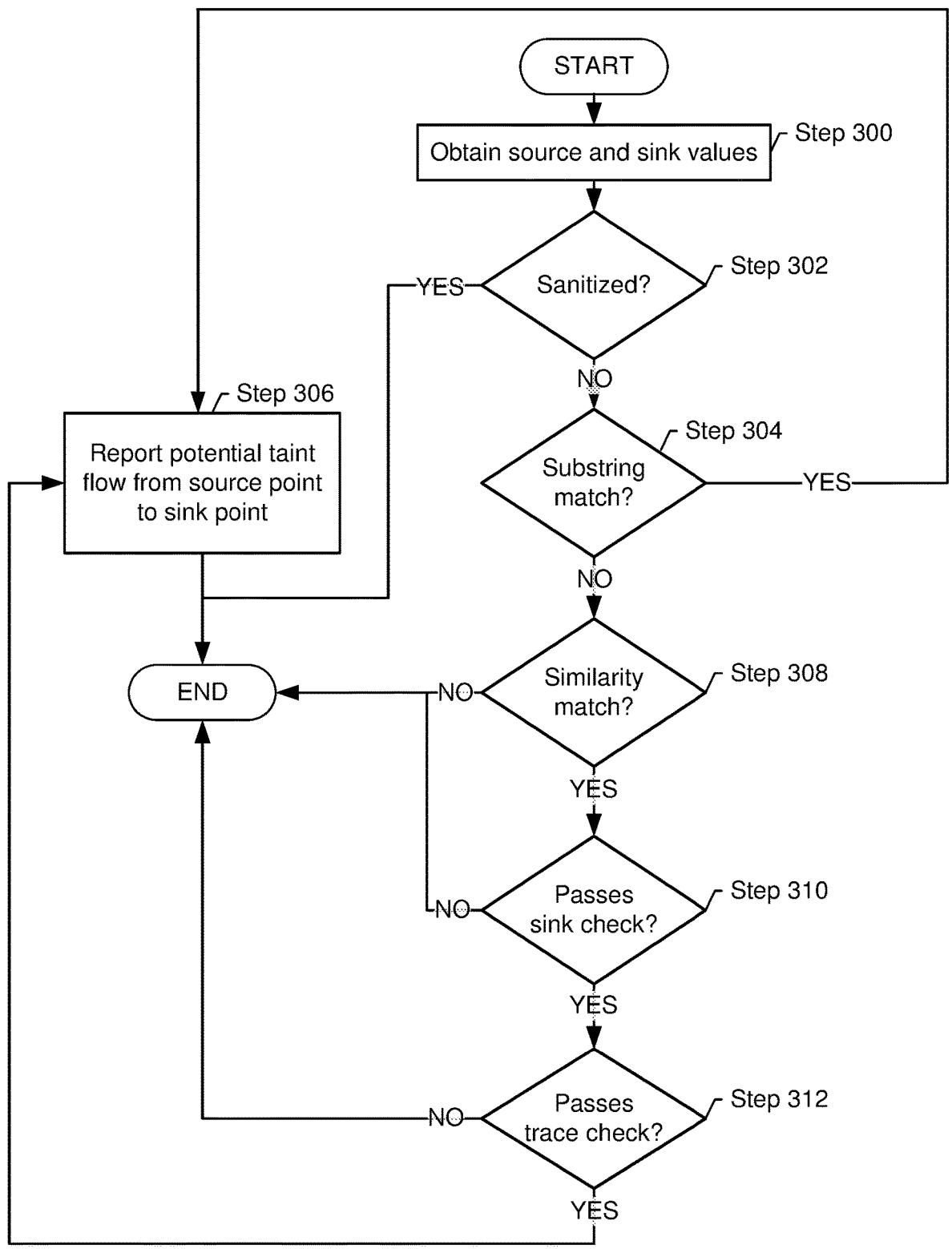

FIG. 3 shows a flowchart in accordance with one or more embodiments of the invention. The flowchart depicts a process for inferring taint flows. Moreover, the flowchart in FIG. 3 illustrates specific taint inferences and taint checks described in Step 202 and Step 204 of FIG. 2. One or more of the steps in FIG. 3 may be performed by the components (e.g., the taint detector (104) or the runtime system (106)) of the computer system (100), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, source and sink values are obtained (see description of Step 200 above).

If, in Step 302, it is determined that the source value and/or the sink value is sanitized, then Step 304 below is executed. Otherwise, the process ends.

In one or more embodiments, the runtime system tracks a set of tainted values and removes a value from the set when the value has been examined and/or modified by a sanitizer. For example, sanitizers may be identified by matching each statement in the code to a list of known sanitizer statements and/or functions. In one or more embodiments, the value is considered to be sanitized when the value is removed from the set of tainted values.

In one or more embodiments, a value derived from an operation on a tainted value may be considered tainted (or sanitized) and thus may be added to (or removed from) the set of tainted values. For example, if the operation is taint-preserving (e.g., the operation is not a sanitizer), but the return value is dissimilar to the source value, the return value of the operation may still be tracked as tainted. In addition, if the operation is taint-removing (e.g., the operation is a sanitizer), the taint value may be removed from the set of tainted values even when the return value is similar to the source value.

If, in Step 304, it is determined that there is an exact substring match between the source value and the sink value that exceeds a predetermined threshold length (e.g., 8 characters), then Step 306 below is executed to report an actual taint flow. That is, the exact substring match may be considered clear evidence of an actual taint flow from the source value to the sink value. Otherwise, if Step 304 determines that there is no substring relationship between the source value and the sink value, then Step 308 below is executed.

In Step 306, a taint flow between the source point and the sink point is reported. In one or more embodiments, an entry corresponding to the taint flow is made in a report file. The entry may include the source point, the source value, the sink point, and the sink value. If an execution trace has been generated for the code (e.g., see description of Step 310 and Step 312 below), then the entry may include the execution trace.

If, in Step 308, it is determined that there is a similarity match between the source value and the sink value, then Step 310 below is executed. Otherwise, the process ends.

The similarity match may be considered evidence of a potential taint flow from the source value to the sink value worthy of additional investigation.

In one or more embodiments, the similarity match is based on a similarity score exceeding a predetermined similarity threshold. The similarity score may be based on an edit distance between the source and sink values. The edit distance may be based on various algorithms that calculate the distance between string values (e.g., the Levenshtein algorithm, longest common subsequence (LCS) algorithms, etc.). For example, the edit distance may be based on the longest common subsequence (LCS) in the source value and the sink value. The LCS is not required to occupy consecutive positions within the source value and/or the sink value. For example, the LCS of the strings "abdexz" and "acdyz" is "adz". The edit distance may be defined as the minimum number of insert and/or delete operations needed to derive the LCS. The insert and delete operations may be character-level string operations (e.g., such that inserting or deleting N characters is counted as N operations).

In one or more embodiments, the similarity score may be based on the length of the source value and/or the length of the sink value. The similarity score may also be based on the minimum number of insert and/or delete operations needed to derive the LCS. As an example, the similarity score may be calculated via the formula:

$$(L-(D_i+D_d))/L$$

where L is the length of the source value or sink value (whichever value is larger), where $D_i$ is the number of insert operations needed to derive the LCS, and where $D_d$ is the number of delete operations needed to derive the LCS. Thus, the similarity score may be low when the number of insert and delete operations needed to derive the LCS is almost as large as the length of the source or sink values.

The similarity threshold may be determined based on experimentation. For example, the effectiveness of various similarity thresholds may be measured relative to minimizing false negatives and false positives when detecting security vulnerabilities based on taint flows in actual code.

If, in Step 310, it is determined that the source value/sink value combination passes a sink check, then Step 312 below is executed. Otherwise, the process ends.

The sink check is based on mutating (e.g., at random) the source value, re-executing the code, and observing how the sink value changes in response to the mutated source value. For example, the mutated characters may not appear in the sink value.

There are several possible outcomes to the sink check:
1) the sink point is not reached when the code is re-executed, in which case, the sink check is inconclusive. Additional taint checks may be performed (e.g., in Step 312 below) to determine whether the potential taint flow is a false positive or an actual taint flow.
2) the sink value is unchanged when the code is re-executed, in which case, the potential taint flow is labeled as a false positive, since mutating the source value had no impact on the sink value, and therefore the sink value does not appear to be attacker-controlled.
3) the sink value is different after re-executing the code, in which case, the sink check is inconclusive, and the potential taint flow cannot be ruled out as a false positive, and further taint checks may be performed (e.g., in Step 312 below).

If, in Step 312, it is determined that the source value/sink value combination passes a trace check, then Step 306 above is executed to report a taint flow between the source point and the sink point. Otherwise, the process ends.

The trace check is based on generating an execution trace for a portion of the code between the source point and the sink point. The trace check may analyze the execution trace to identify a series of operations that transform the source value into the sink value. The trace check may identify potentially tainted operations in the execution trace whose arguments or base variables match the source value. For example, the match may be based on a substring relationship, as discussed in the description of Step 304 above. Alternatively, the match may be based on a similarity relationship, for example, where the similarity score between the arguments or base variables of the operation and the source value are within a similarity threshold, as discussed in the description of Step 308 above.

The trace check may reuse a result generated by a taint inference (e.g., a taint inference performed in Step 304 or Step 308 above). In one or more embodiments, the trace check compares the number of potentially tainted operations in the execution trace to the number of insertions and the number of deletions calculated during the edit distance taint inference of Step 308 above. For example, if the number of insertions calculated during the edit distance taint inference is greater than 0, but the number of potentially tainted insertion operations in the trace is equal to 0, then the potential taint flow identified in Step 308 above may be labeled as a false positive. Similarly, if the number of deletions calculated during the edit distance taint inference is greater than 0, but the number of potentially tainted deletion operations in the trace is equal to 0, then the potential taint flow identified in Step 308 above may be labeled as a false positive. Alternatively, the trace check may use some other comparison between the potentially tainted operations in the execution trace and the number of insertions and the number of deletions calculated during the edit distance taint inference of Step 308 above. For example, an alternate comparison may be based on determining the number of characters inserted and/or deleted by the potentially tainted operations (e.g., including string concatenation, substring, and/or split operations) in the execution trace, and then comparing the result to the number of character-level insertions and the number of character-level deletions calculated during the edit distance taint inference.

In one or more embodiments, the runtime system may determine whether the arguments or base variables of the potentially tainted operations in the execution trace have been modified by a sanitizer. For example, the runtime system might not track a set of tainted values (see description of Step 302 above). The presence of a sanitized value in the arguments or base variables of the potentially tainted operations may indicate that there is no taint flow between the source value and the sink value (i.e., the potential taint flow between the source value and the sink value represents a false positive).

In one or more embodiments, if no traced series of operations can be found to transform the sink value from the source value, then the potential taint flow identified in Step 308 above may be labeled as a false positive. Otherwise, if the trace check is unable to label the potential taint flow identified in Step 308 above as a false positive, then the potential taint flow may be labeled as an actual taint flow.

In one or more embodiments, the runtime system keeps track of a request that was active (e.g., pending) when each operation was executed in order to prevent spurious (e.g., false positive) taint flows from being detected between source and sink values from different, unrelated requests. For example, the request may be a Hypertext Transfer Protocol (HTTP) request received by, or sent from the computer system. Requests may be initiated by the actions of users, and may be handled by one or more asynchronous events which may be executed in background threads of the computer system. In one or more embodiments, a potential taint flow is reported only when the source value and the sink value are both related to the same request. In one or more embodiments, the runtime system labels each of the potentially tainted operations in the execution trace with an active request.

Figure 4A:
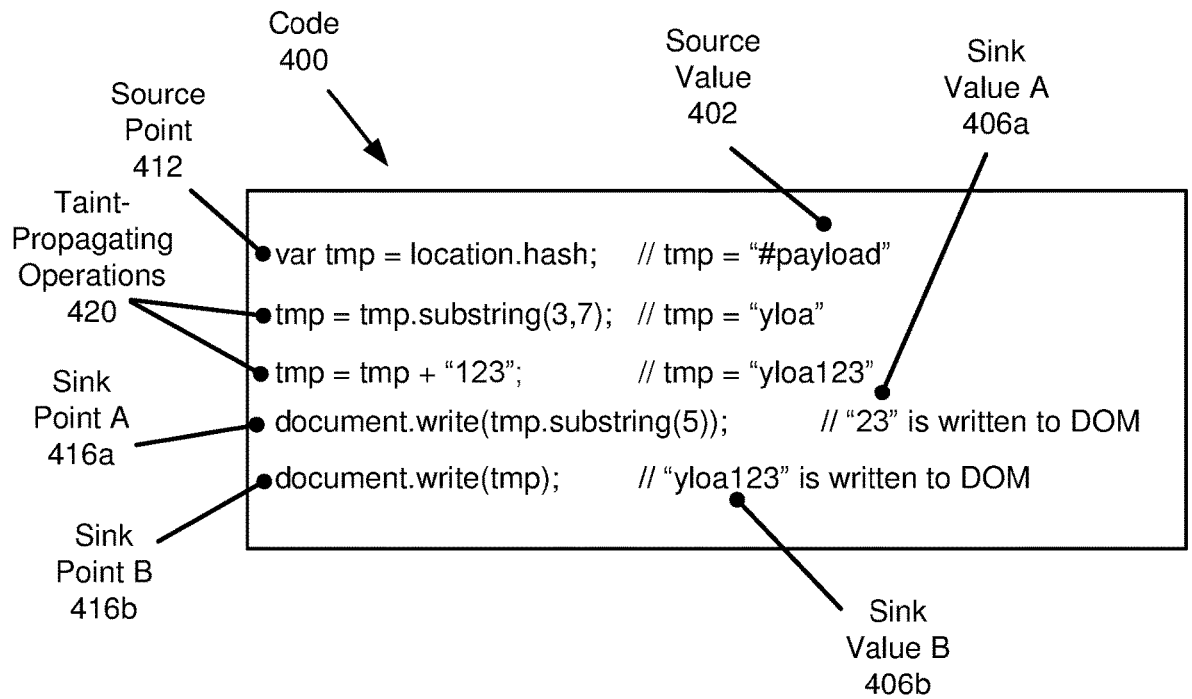
FIG. 4A and FIG. 4B show examples in accordance with one or more embodiments of the invention.
Figure 4B:
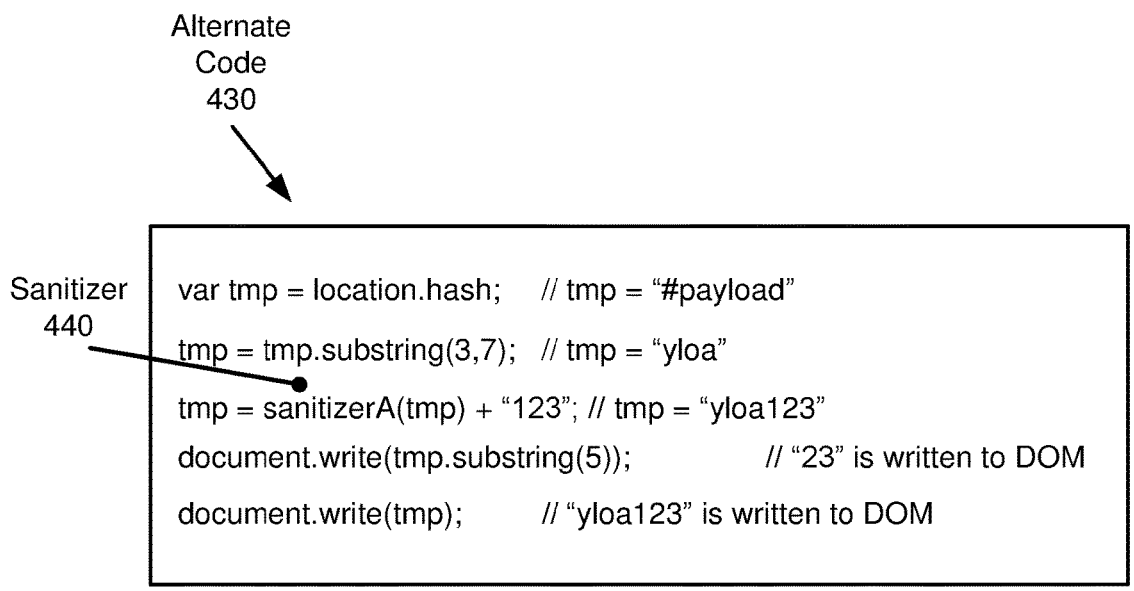

The following example is for explanatory purposes only and not intended to limit the scope of the invention. FIG. 4A and FIG. 4B show an implementation example in accordance with one or more embodiments of the invention.

FIG. 4A illustrates a snippet of code (400) ((110) in FIG. 1) for which a taint analysis is to be performed by the taint detector ((104) in FIG. 1). Initially, the runtime system ((106) in FIG. 1) identifies a source value (402) at a source point (412) and sink values (406a, 406b) at sink points (416a, 416b) generated during the execution of the code (400). The taint detector then attempts to infer a relationship between the source value (402) and each of the sink values (406a, 406b).

When attempting to infer a relationship between the source value (402) ("#payload") and sink value A (406a) ("23"), the taint detector first determines that there is not an exact substring match between the source value (402) and sink value A (406a) within a predefined threshold length of 1. In fact, the source value (402) and sink value A (406a) do not share any common characters. Next, the taint detector determines that there is no similarity match between the source value (402) and sink value A (406a) within a predefined similarity threshold of 0.09. The similarity match is based on the edit distance between the source value (402) and sink value A (406a) relative to the longest common subsequence (LCS) in the source value (402) and sink value A (406a). However, the LCS in the source value (402) and sink value A (406a) is the empty string, due to the lack of any common characters. Thus, the taint detector concludes that there is no taint flow between the source value (402) and sink value A (406a).

When attempting to infer a relationship between the source value (402) and the sink value B (406b) ("yloa123"), the taint detector first determines that there is not an exact substring match between the source value (402) and the sink value B (406b) within a predefined threshold length of 1. Next, the taint detector determines the similarity score between the source value (402) and the sink value B (406b) using the edit distance to the LCS from the source value (402) and the sink value B (406b). In this case, the LCS is "yloa", which is derived from the source value (402) using 4 character-level deletions ($D_d$), and is derived from the sink value B (406b) using 3 character-level insertions ($D_i$). The taint detector computes the similarity score between the source value (402) and the sink value B (406b) as follows:

$$(L-(D_i+D_d))/L=(8-(3+4))/8=0.125, \text{ where } L \text{ is the length of the source value (402).}$$

There is a similarity match since the similarity score exceeds the predefined similarity threshold of 0.09. Thus, the taint detector next performs taint checks to further investigate whether a taint flow exists between the source value (402) and the sink value B (406b).

The first taint check performed by the taint detector is a sink check based on randomly mutating the source value (402), re-executing the code, and observing how the sink value B (406b) changes in response to the mutated source value. In this example, as long as at least one of the characters in the LCS "yloa" is changed by the random mutation, a corresponding change will be observed in the sink value B (406b), demonstrating the dependence of the sink value B (406b) on the source value (402). Thus, the taint detector continues investigating whether a taint flow exists between the source value (402) and the sink value B (406b) by performing a trace check.

The runtime system then generates an execution trace for the portion of the code between the source point (412) and sink point B (416b). The taint detector then analyzes the execution trace to identify a series of operations that transform the source value (402) into the sink value B (406b). The taint detector identifies 2 taint-propagating operations (420) in the execution trace whose arguments match the source value (402). In this case, the taint-propagating operations (420) are built-in functions. The taint-propagating operations (420) include an insertion operation (i.e., the string concatenation operation) and a deletion operation (i.e., the substring operation). The taint detector checks whether the taint-propagating operations (420) identified in the execution trace are consistent with the results of the earlier performed similarity match between the source value (402) and the sink value B (406b). Since the number of insertions ($D_i$) and the number of deletions ($D_d$) needed to derive the LCS during the edit distance calculation were both nonzero, and the taint-propagating operations (420) include both an insertion operation and a deletion operation, the taint detector concludes that the execution trace is consistent with the results of the earlier performed similarity match. Therefore, the taint detector reports the pair <source point (412), sink point B (416b)> as a taint flow.

FIG. 4B illustrates alternate code (430) that includes a sanitizer (440). When generating the execution trace with the alternate code (430), the runtime system determines that an argument of one of the taint-propagating operations ((420) in FIG. 4A) matches an argument that has been examined and/or modified by the sanitizer (440). When performing the trace check, the taint detector concludes, based on the presence of the sanitizer (440) in the taint-propagating operations, that there is no taint flow between the source value (402) and the sink value B (406b). Thus, the taint detector does not report the taint flow between the source value (402) and the sink value B (406b).

Figure 5A:
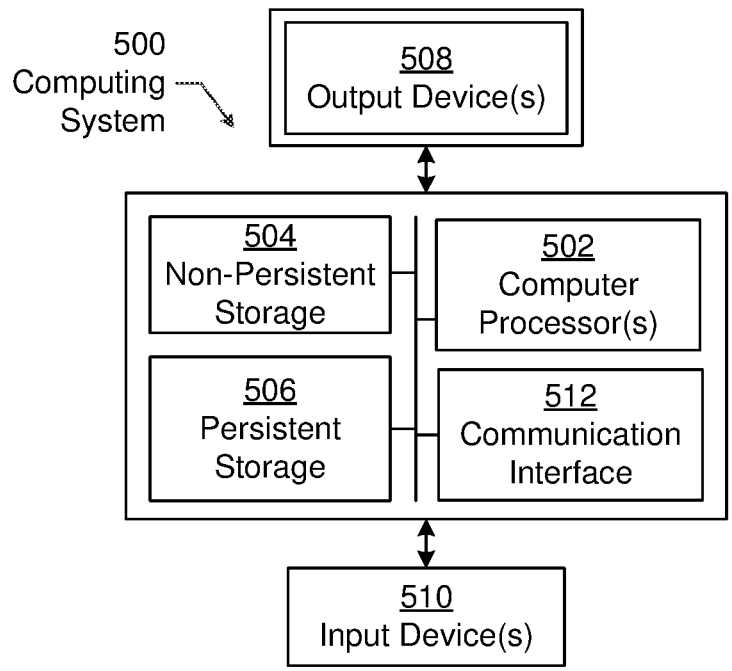
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
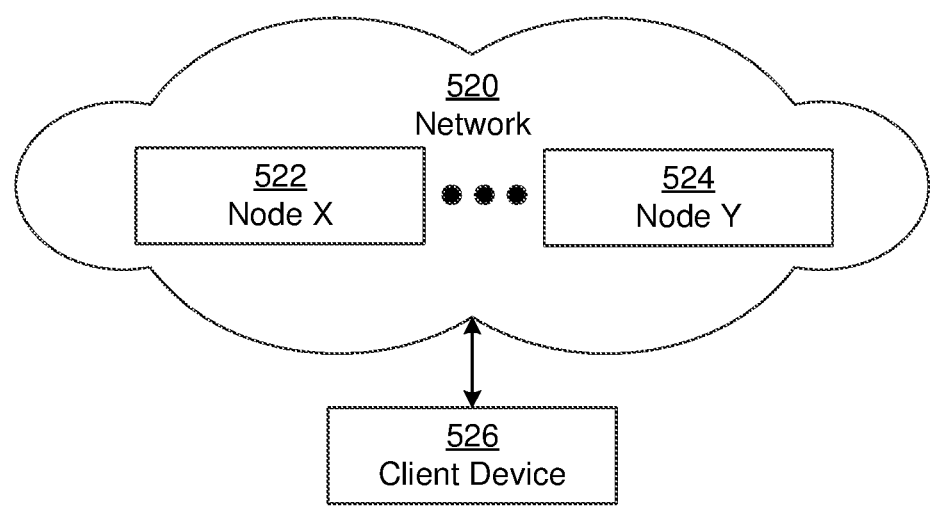

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining, from a runtime system that executes code, a source value at a source point of the code and a sink value at a sink point of the code;
   identifying a potential taint flow from the source point to the sink point by performing a series of taint inferences that each infer a relationship between the source value and the sink value;
   determining whether the potential taint flow is an actual taint flow by performing a series of taint checks that each analyze the execution of the code using the source value and the sink value;
   generating an execution trace for a portion of the code between the source point and the sink point; and
   determining, using the execution trace, whether there is a series of operations that transforms the source value into the sink value.

2. The method of claim 1, further comprising: in response to determining that the potential taint flow is an actual taint flow, generating a report comprising the source value, a location of the source point, the sink value, and a location of the sink point.

3. The method of claim 1, wherein one of the series of taint inferences determines whether there is a substring match between the source value and the sink value.

4. The method of claim 1, wherein one of the series of taint inferences determines whether an edit distance between the source value and the sink value is within a predetermined threshold.

5. The method of claim 1, wherein one of the series of taint checks comprises:
   mutating the source value; and
   determining the impact, on the sink value, of executing the code using the mutated source value.

6. The method of claim 1,
   wherein each of the series of operations is associated with a same request.

7. The method of claim 1,
   wherein the series of operations generates a series of intermediate values, and
   wherein the taint check further comprises determining that a sanitizer has been applied to one selected from the group consisting of the source value, the sink value, and the series of intermediate values.

8. The method of claim 1, wherein the taint check further comprises reusing a result generated by one of the series of taint inferences.

9. A system, comprising:
   a repository configured to store code, wherein the code comprises a source value at a source point and a sink value at a sink point;
   a memory coupled to a processor;
   a runtime system executing on the processor and using the memory, configured to:
      identify, by executing the code, the source point and the sink point; and
   a taint detector, executing on the processor and using the memory, configured to:
      identify a potential taint flow from the source point to the sink point by performing a series of taint inferences that each infer a relationship between the source value and the sink value;
      determine whether the potential taint flow is an actual taint flow by performing a series of taint checks that each analyze the execution of the code using the source value and the sink value;
      generate an execution trace for a portion of the code between the source point and the sink point; and
      determine, using the execution trace, whether there is a series of operations that transforms the source value into the sink value.

10. The system of claim 9, wherein the taint detector is further configured to: in response to determining that the potential taint flow is an actual taint flow, generate a report comprising the source value, a location of the source point, the sink value, and a location of the sink point.

11. The system of claim 9, wherein the taint detector is further configured to perform a taint inference that determines whether there is a substring match between the source value and the sink value.

12. The system of claim 9, wherein the taint detector is further configured to perform a taint inference that determines whether an edit distance between the source value and the sink value is within a predetermined threshold.

13. The system of claim 9, wherein the taint detector is further configured to perform a taint check that:
   mutates the source value; and
   determines the impact, on the sink value, of executing the code using the mutated source value.

14. The system of claim 9,
wherein each of the series of operations is associated with a same request.

15. The system of claim 9,
wherein the series of operations generates a series of intermediate values, and
wherein the taint detector is further configured to perform the taint check by determining that a sanitizer has been applied to one selected from the group consisting of the source value, the sink value, and the series of intermediate values.

16. A non-transitory computer readable medium comprising instructions that, when executed by a processor, perform:
obtaining, from a runtime system that executes code, a source value at a source point of the code and a sink value at a sink point of the code;
identifying a potential taint flow from the source point to the sink point by performing a series of taint inferences that each infer a relationship between the source value and the sink value;
determining whether the potential taint flow is an actual taint flow by performing a series of taint checks that each analyze the execution of the code using the source value and the sink value;
generating an execution trace for a portion of the code between the source point and the sink point; and
determining, using the execution trace, whether there is a series of operations that transforms the source value into the sink value.

17. The non-transitory computer readable medium of claim 16, further comprising instructions that perform: in response to determining that the potential taint flow is an actual taint flow, generating a report comprising the source value, a location of the source point, the sink value, and a location of the sink point.

18. The non-transitory computer readable medium of claim 16, wherein one of the series of taint checks comprises:
mutating the source value; and
determining the impact, on the sink value, of executing the code using the mutated source value.

19. The non-transitory computer readable medium of claim 16,
wherein each of the series of operations is associated with a same request.

20. The non-transitory computer readable medium of claim 16,
wherein the series of operations generates a series of intermediate values, and
wherein the taint check further comprises determining that a sanitizer has been applied to one selected from the group consisting of the source value, the sink value, and the series of intermediate values.

* * * * *